Jan. 15, 1963  A. C. JERMYN  3,073,561
HOLDER FOR DENTAL HAND UNIT
Filed Oct. 12, 1960  2 Sheets-Sheet 1
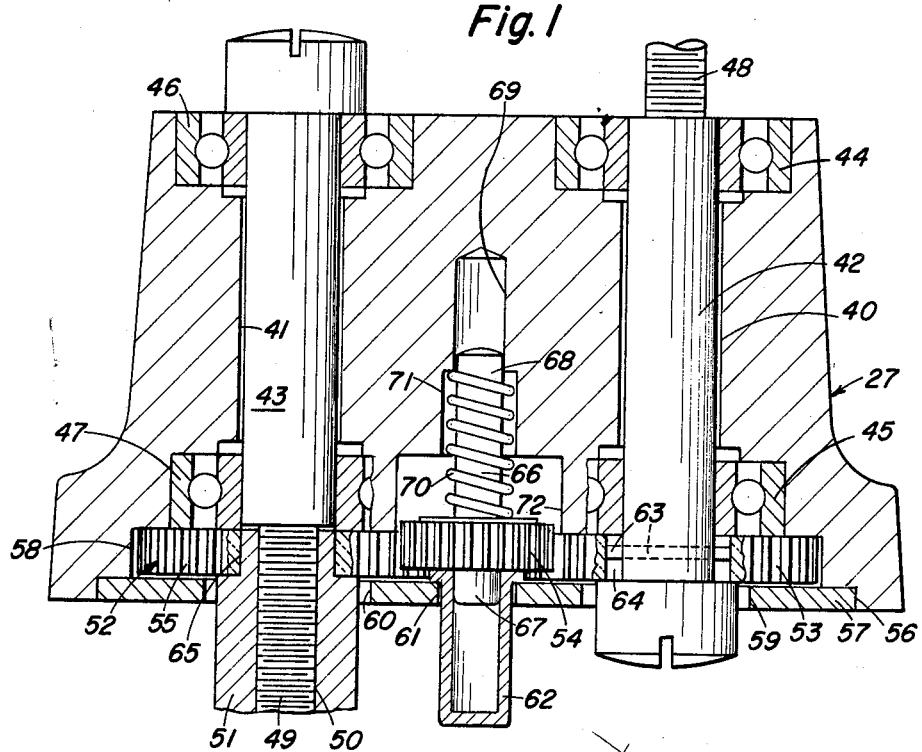
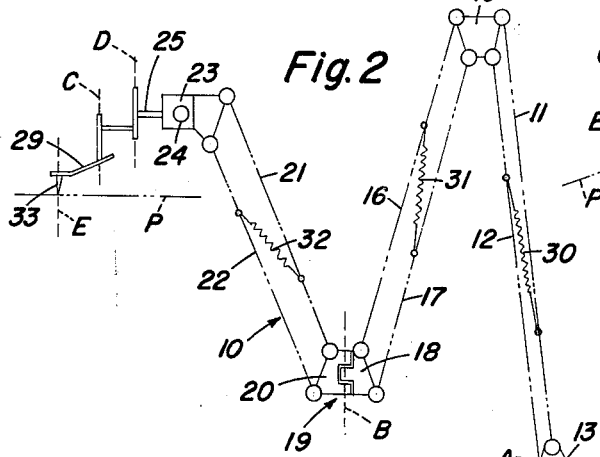
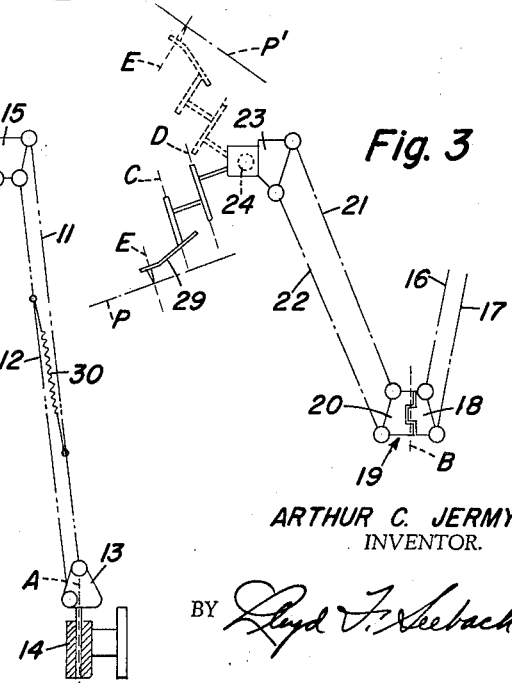
ARTHUR C. JERMYN
INVENTOR.
BY *Lloyd F. Seebach*
AGENT Jan. 15, 1963     A. C. JERMYN     3,073,561
HOLDER FOR DENTAL HAND UNIT
Filed Oct. 12, 1960     2 Sheets-Sheet 2
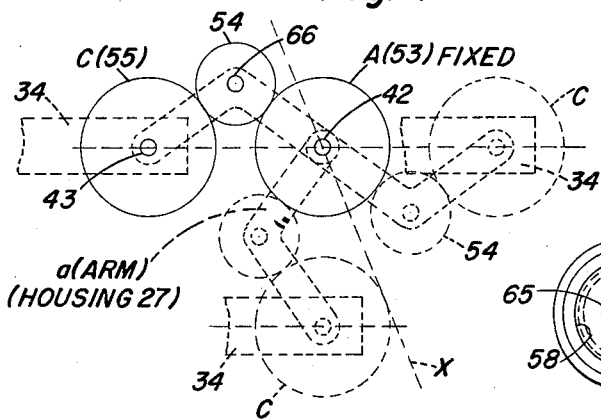
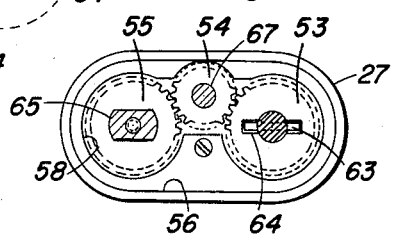
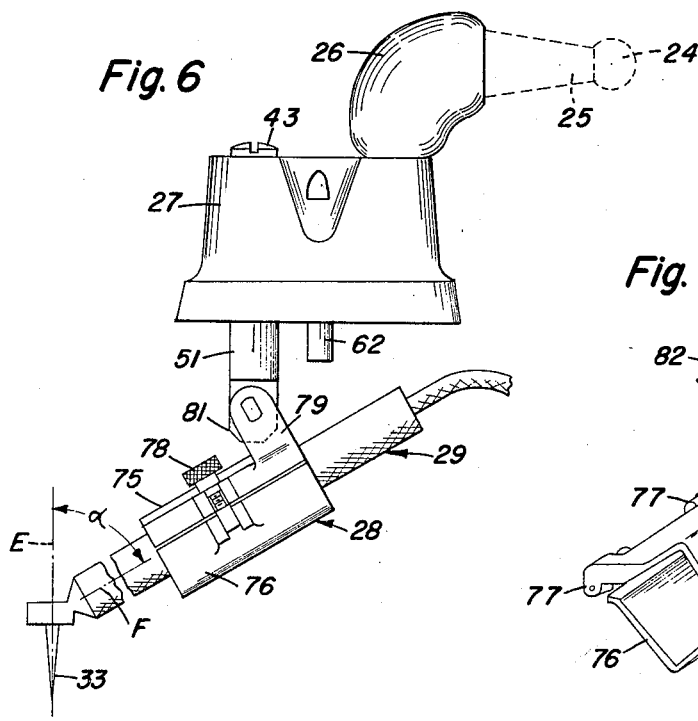
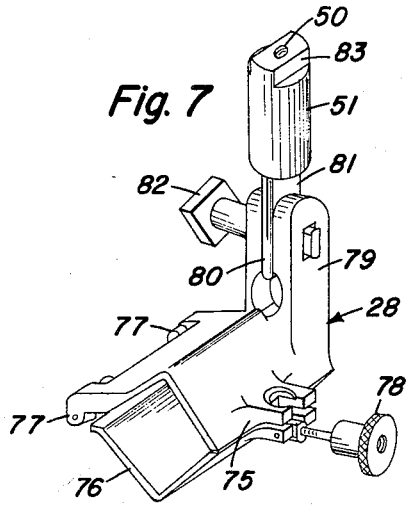
ARTHUR C. JERMYN
INVENTOR.
BY *Lloyd F. Seebach*
AGENT

United States Patent Office 3,073,561
Patented Jan. 15, 1963

3,073,561
HOLDER FOR DENTAL HAND UNIT
Arthur C. Jermyn, 240 Danbury Circle N.,
Rochester 18, N.Y.
Filed Oct. 12, 1960, Ser. No. 62,116
7 Claims. (Cl. 248—284)

The present invention relates to a device for holding a work or tool holder and more particularly to a device for holding a dental hand unit and maintaining the orientation thereof constant as the unit is moved about an axis spaced from and parallel to the mounting axis of the holder for the hand unit.

In my copending application Serial No. 833,581, filed August 13, 1959, there is disclosed a dental apparatus for maintaining the axis of a dental burr normal to a predetermined plane. This device or apparatus discloses a housing which is mounted with respect to a parallelogram linkage and carries a holder in which the dental hand unit for the burr is mounted, the housing having two axes and being rotatable about one whereas the hand unit holder is mounted with respect to the other. When the housing is moved about the one axis, it is necessary for the dentist to maintain the orientation of the unit by carefully holding the unit as it is also moved. It is evident that it is important to not only maintain the relationship of the burr to the occlusal plane but to also maintain the set orientation of the unit without going back and realigning the burr to the previous cut.

This is accomplished in the invention to be described hereinafter by interconnecting the two axes of the housing in such a way that the orientation of the unit is constant for all positions of the housing. More specifically, the housing described in the above-mentioned application includes two spaced and parallel studs, one stud securing the housing to the pantograph linkage and the other stud securing the dental hand unit holder to the housing. With this arrangement, the first stud is held in fixed relation and the housing rotates thereabout. By holding the dental hand unit as it and the housing are rotated about the first stud, the orientation of the dental hand unit can be maintained constant but depends on being held in this position by the operator. If the unit is released or movement of the unit is allowed to occur in the course of holding, then the orientation of this unit is no longer constant or maintained.

The disadvantage just described has been overcome by interconnecting the first stud and the holder secured to the second stud by a planetary gear train. Two gears of the same size and an idler gear comprise the train, one gear being fixed to the first stud, the other gear being fixed to the holder and the idler gear being freely mounted on the housing and interconnecting the other two gears. The idler gear rolls around the gear fixed to the first stud, when the housing is moved about the first stud and its motion is transmitted to the other gear fixed to the unit holder. Because the two gears are the same size, that is of the same pitch and having the same number of teeth, no effective motion is transmitted to the holder so its orientation with respect to a plane passing through the first stud remains constant for all positions as the housing is moved about the first stud. Further, by mounting the idler gear so it can be releasably disengaged from the other two gears, the orientation of the unit holder can be varied or changed at any time.

It is the primary object of the invention, therefore, to provide a device for an element by which the orientation of the element remains constant for any position thereof as the device is moved about a fixed axis.

Another object of the invention is to provide a housing for supporting an element with respect to one axis and which is movable about a second axis spaced from and parallel to the first axis wherein an element oriented with respect to the first axis is maintained constant by means interconnecting the second axis and the element.

Still another object of the invention is to provide means interconnecting two spaced and parallel axes whereby an element mounted with respect to one of the axes and oriented with respect to a plane passing through the other axis is maintained in its oriented position as it is moved about the other axis.

And yet another object of the invention is to provide a planetary gear train interconnecting two spaced and parallel axes whereby the orientation of an element mounted with respect to one axis and to a plane passing through the other axis is maintained constant for any position of said one axis as it is moved about the other axis.

These and other objects and advantages will be apparent to those skilled in the art by the detailed description which follows.

Reference is now made to the accompanying drawings wherein like reference numerals designate like parts and wherein:

FIG. 1 is a vertical sectional view through the housing showing the relation of the various elements;

FIGS. 2 and 3 are diagrammatic views of a parallelogram linkage used in conjunction with the housing structure disclosed in FIG. 1;

FIG. 4 is a diagrammatic view of the planetary gear train shown in FIG. 1;

FIG. 5 is a bottom view of FIG. 1 with the retaining plate removed and showing the arrangement of the elements comprising the planetary gear train;

FIG. 6 is a side elevation of the housing, a dental hand unit holder and a dental hand unit in assembled relation; and FIG. 7 is a perspective view of the dental hand unit holder shown in FIG. 6.

In my above-mentioned application, the assembly shown diagrammatically in FIGS. 2 and 3 is described in detail and only a brief description will be included herein to obtain an understanding of the invention as used in conjunction with this apparatus. The linkage 10 comprises links 11 and 12 pivotally mounted at one end on bracket 13 which, in turn, is pivotally mounted in wall bracket 14. The other ends of links 11 and 12 are pivotally connected to plate 15 which also carries the ends of links 16 and 17 pivotally mounted thereon. The other ends of links 16 and 17 are pivotally mounted on bracket 18 which forms half of a hinge member 19 comprising bracket 18 and bracket 20 to which the ends of links 21 and 22 are pivotally connected. The other ends of links 21 and 22 are pivotally mounted on socket 23 which receives the ball 24 on the end of arm 25 secured to elbow 26, see FIG. 6. Elbow 26 retains housing 27 which, in turn, carries holder 28 for the dental hand unit 29. When the assembly is complete as shown diagrammatically in FIG. 2, linkage 10 including links 11, 12, 16, 17, 21 and 22 can be moved about axis A and links 21 and 22 can be moved about axis B carrying housing 27, holder 28 and unit 29 therewith. Also, the entire unit can be moved toward or away from the wall on which bracket 14 is mounted, springs 30, 31 and 32 between the respective pairs of links serving to hold the unit in any desired position.

Housing 27 includes an axis C and an axis D which are spaced from and parallel to each other. Various makes of dental hand units have different angles α, see FIG. 6, that is the angle formed by the axis E of burr 33 and the axis F of the handle portion of unit 29. As a result, holder 28 as described hereinafter must be adjustable to accommodate for the difference in angle α which occurs for a particular dental hand unit. To set burr 23 so its axis E is normal to the occlusal plane P, arm 25 is adjusted in socket 23 and then locked in position. The parts of the unit will then assume positions such as shown in FIG. 2. For any angle of the occlusal plane, the axis E of burr 33 and axes C and D of housing 27 will always be parallel and as the assembly is moved or the housing is moved about axis D, the axis E will always be normal to the occlusal plane. Also, as shown in dotted lines in FIG. 3, the housing, holder and dental hand unit can be rotated through 180° about the center of ball 24 to utilize burr 33 with respect to the occlusal plane P' without changing the relation of the parts. This is useful when burr 33 is to be used, for example, with respect to teeth in both the upper and lower jaw.

As housing 27 is moved about axis D, it is often desirable to maintain the orientation of unit 29 constant. This can be accomplished by the apparatus just described only if the operator holds the unit 29 in the position desired. This is not always possible or convenient inasmuch as the operator may wish to release the unit for an interval of time in order to perform some other task. As a result, the original setting is lost and can then be obtained only by setting and orienting the dental hand unit as nearly as possible to what it was at the time of release. It is with this latter matter that the present invention is concerned, that is, with providing a device whereby the orientation of the dental hand unit remains constant and requires no resetting or readjustment irrespective of intermittent or continuous use thereof.

Reference is now made to FIGS. 1, 4 and 5 wherein housing 27 is provided with parallel holes 40 and 41 in which studs 42 (axis D) and 43 (axis C) are mounted by means of bearings 44 and 45 and 46 and 47, respectively, both studs being freely rotatable in said housing by means of their respective bearings. The end of stud 42 which protrudes beyond housing 27 is threaded as at 48, the threaded end being received by a threaded hole (not shown) in elbow 26 for mounting housing 27 to elbow 26 and, hence, to the linkage 10. In a similar manner, stud 43 is threaded as at 49 and is utilized for holding or retaining holder 28 when threaded end 49 is received by the threaded hole 50 in the end of shank 51 which is part of holder 28, see FIG. 7.

A gear train designated by the numeral 52 includes a first gear 53, an idler gear 54 and a second gear 55. At the bottom of housing 27 a recess 56 is provided for cover plate 57 together with a recess 58 in which gear train 52 is arranged. Cover plate 57 is provided with an opening 59 for the head of stud 42, an opening 60 for the shank 51 and an opening 61 for sleeve 62. Gear 53 is fixed in relation to stud 42 by means of a pin 63 which is carried by said stud and the ends of which engage a slot 64 in gear 53, said gear being retained between the head of stud 42 and bearing 45. Gear 55 is freely rotatable on the end of stud 43 and is retained in alignment therewith by cover plate 57. Gear 55 is provided with an opening 65 of the shape best shown in FIG. 5 for receiving the end of shank 51 and thereby providing a driving connection therewith. Idler gear 54 is rotatably mounted on pin 66 which has one end 67 extending through said gear and into sleeve 62 and the other end 68 extending into opening 69 in housing 27. As shown in FIG. 1, end 68 is surrounded by spring 70 which is seated in recess 71 which, in turn, is an extension of the recess 72 which is larger in diameter than gear 54. Accordingly, when sleeve 62 is moved against the action of spring 70, gear 54 is disengaged from gears 53 and 55 and moved into recess 72, the end 68 of pin 66 moving farther into opening 69 for a purpose to be described hereinafter. While the described embodiment discloses gear 54 as being releasably disengaged from gears 53 and 55, any one of the gears can be so released to attain the same result.

As described above, stud 42 becomes fixed when threaded into elbow 26 to retain housing 27 and, as a result, gear 53 is also fixed since it is retained against motion by pin 63. With shank 51 positioned with respect to housing 27 and retained by stud 43, gear 55 is, in effect, part of shank 51 and holder 28. Since gear 54 interconnects gears 53 and 55, movement of housing 27 about stud 42 will cause gear 54 to roll about gear 53 because it is fixed. The rotation of gear 54 will be transmitted to gear 55 but because of the relationship of the gears there will be no effective rotation of holder 28. This is accomplished by making gears 53 and 55 of the same size and under this condition, the orientation of holder 28 remains constant.

Gears 53, 54 and 55 form an epicyclic gear train and when gears 53 and 55 are of the same pitch and have the same number of teeth, there is no effective motion of holder 28 as housing 27 is moved about stud 42. This can be shown by reference to FIG. 4 and to the text "Elements of Mechanism," by Schwamb, Merrill, and James in which the formula $e(AC)=n(C)-a/m-a$ is used to determine the speeds in an epicyclic train; $e(AC)$ representing the ratio of $A/C$ (gear 55/gear 53); $n(C)$ representing the turns of C (gear 53); $m$ representing the turns of A (gear 55); and $a$ representing the turns of arm D (housing 27). Since A and C have equal numbers of teeth, $e(AC)$ equals 1, and because A is fixed $m=0$. If housing 27 is turned through 90° about stud 42, $a=\frac{1}{4}$. Then $1=n(C)-\frac{1}{4}/0-\frac{1}{4}$ and $n(C)=0$. For any value of $a$, $n(C)$ will always equal 0 so that the effective rotation of C is always 0. In other words, the orientation of hand unit 29 with respect to any plane X passing through the axis of stud 42 will be constant for any position of the axis of stud 43 as it is moved about stud 42. As described above, gear 54 can be disengaged from gears 53 and 55 and with such disengagement unit 29 can be oriented to any desired position since gear 55 and stud 43 are freely rotatable. Once the desired relation of unit 29 has been obtained, sleeve 62 is released and gear 54 is returned to its normal position with respect to gears 53 and 55 by spring 70.

As shown in FIG. 7, holder 28 comprises two angular shaped members 75 and 76 which are hinged as at 77 along one edge and by means of thumbscrew 78 said members clamp the handle portion of dental hand unit 29 therebetween as shown in FIG. 6. Memeber 75 carries an upwardly projecting extension 79 which is provided with a slot 80 for receiving the flat tongue 81 on the end of shank 51, said shank and holder 28 being adjustable to any angular relationship and then clamped in the adjusted position by thumbscrew 82, see FIG. 7. The flat 83 formed on the end of shank 51 is received by an opening of the same shape in gear 55 and said gear, in effect, is actually coupled to holder 28 and hand unit 34 which are retained by stud 43 as described hereinabove.

From the foregoing description it can be readily appreciated that by proper adjustment of arm 25 relative to linkage 10 and of holder 28 relative to shank 51 and stud 43, the angular relation of burr 33 to any plane can be readily established. Also, by releasing idler gear 54 from gears 53 and 55, the orientation or angular relation of hand unit 29 to a plane passing through the axis or stud 42 can be established and will remain constant as housing 27 is moved about stud 42, this condition being maintained by gear train 52.

It will be evident to those skilled in the art that other gear or linkage systems might be devised to accomplish the same result and the invention is, therefore, not to be limited to the embodiment disclosed and described herein, but is of a scope as defined by the appended claims.

Having now particularly described my invention, what I desire to secure by Letters Patent of the United States and what I claim is:

1. A device for supporting a dental hand unit at the free end of a movable linkage comprising a holder for said dental hand unit, a housing, a first member rotatably mounted in said housing for securing said housing to said free end of said movable linkage and having an axis about which said housing is movable, a second member rotatably mounted in said housing for securing said holder to said housing and having an axis spaced from and parallel to said axis of said first member about which said holder is movable, and a planetary gear train interconnecting said first member and said holder, said plantary gear train including a first gear fixed to said first member, a second gear fixed in relation to said holder, and a third gear rotatably mounted on said housing and interconnecting said first and second gears, for maintaining constant the angular orientation of said holder with respect to a plane passing through said axis of said first member as said housing is moved about said axis of said first member.

2. A device for supporting a dental hand unit at the free end of a movable linkage comprising a holder for said dental hand unit, a housing, a first member rotatably mounted in said housing for securing said housing to said free end of said movable linkage and having an axis about which said housing is movable, a second member rotatably mounted in said housing for securing said holder to said housing and having an axis spaced from and parallel to said axis of said first member about which said holder is movable, a planetary gear train interconnecting said first member and said holder, said planetary gear train including a first gear fixed to said first member, a second gear fixed in relation to said holder, and a third gear rotatably mounted on said housing and interconnecting said first and second gears, for maintaining constant the angular orientation of said holder with respect to a plane passing through said axis of said first member as said housing is moved about said axis of said first member, and means operatively connected to said gear train for changing the angular orientation of said holder with respect to said plane.

3. A device in accordance with claim 2 wherein said second gear is identical to the first gear and releasably coupled to said holder.

4. A device in accordance with claim 2 wherein one of the gears of said planetary gear train is releasably disengageable from said train for changing the angular orientation of said holder with respect to said plane.

5. A device for supporting a dental hand unit at the free end of a movable linkage comprising a holder for said dental hand unit, a housing, a first stud member rotatably mounted in said housing and having a threaded end for securing said housing to said free end of said movable linkage, said housing being movable about said first member, a second stud member rotatably mounted in said housing, spaced from and parallel to said first stud member, and having a threaded end for securing said holder to said housing, a first gear fixed to said first stud member, a second gear rotatably mounted on said second stud member and releasably coupled in fixed relation to said holder when said holder is secured to said housing by said second stud member, and an idler gear rotatably mounted on said housing and interconnecting said first and second gears, said first and second gears being identical whereby the angular orientation of said holder with respect to a plane passing through said first stud member is maintained constant as said housing is moved about said first stud member.

6. A device in accordance with claim 5 wherein one of said gears is releasably disengageable from the other gears for changing the angular orientation of said holder with respect to said plane.

7. A device in accordance with claim 5 wherein said idler gear is releasably disengageable from said first gear and said second gear for changing the angular orientation of said holder with respect to said plane.

References Cited in the file of this patent

UNITED STATES PATENTS

| | | |
|---|---|---|
| 983,386 | McCulloch | Feb. 7, 1911 |
| 2,073,998 | Raby | Mar. 16, 1937 |
| 2,287,577 | Stava | June 23, 1942 |
| 2,666,344 | Boeck | Jan. 19, 1954 |
| 2,879,675 | Morris | Mar. 31, 1959 |